(12) United States Patent
Ruckwied

(10) Patent No.: US 7,614,389 B2
(45) Date of Patent: Nov. 10, 2009

(54) EXHAUST GAS HEAT EXCHANGER, IN PARTICULAR AN EXHAUST GAS COOLER FOR EXHAUST GAS RECIRCULATION IN A MOTOR VEHICLE

(75) Inventor: Jens Ruckwied, Stuttgart (DE)

(73) Assignee: Behr GmbH & Co. KG, Stuttgart (DE)

( * ) Notice: Subject to any disclaimer, the term of this patent is extended or adjusted under 35 U.S.C. 154(b) by 116 days.

(21) Appl. No.: 11/817,243

(22) PCT Filed: Mar. 23, 2006

(86) PCT No.: PCT/EP2006/002666

§ 371 (c)(1),
(2), (4) Date: Aug. 28, 2007

(87) PCT Pub. No.: WO2006/100072

PCT Pub. Date: Sep. 28, 2006

(65) Prior Publication Data

US 2008/0178577 A1 Jul. 31, 2008

(30) Foreign Application Priority Data

Mar. 24, 2005 (DE) .................... 10 2005 014 295

(51) Int. Cl.
F02M 25/07 (2006.01)
F02B 47/08 (2006.01)
F28F 13/12 (2006.01)
F01N 3/10 (2006.01)
(52) U.S. Cl. .............. 123/568.12; 165/109.1; 60/274
(58) Field of Classification Search ........... 123/568.11, 123/568.12; 60/274, 299, 301, 320, 321; 165/109.1, 153, 166, 168–176
See application file for complete search history.

(56) References Cited

U.S. PATENT DOCUMENTS

| | | | |
|---|---|---|---|
| 4,655,802 A * | 4/1987 | Jaumann | 165/10 |
| 5,194,231 A | 3/1993 | Gough et al. | |
| 5,803,162 A * | 9/1998 | Karbach et al. | 165/109.1 |
| 6,187,273 B1 | 2/2001 | Gaiser | |
| 6,202,402 B1 * | 3/2001 | Sattelmayer | 60/723 |
| 6,269,870 B1 | 8/2001 | Banzhaf et al. | |
| 6,667,011 B1 | 12/2003 | Munje et al. | |
| 6,849,352 B2 * | 2/2005 | Formanski et al. | 429/17 |
| 6,944,947 B1 | 9/2005 | Damsohn et al. | |
| 7,210,469 B1 * | 5/2007 | Saele | 123/568.12 |
| 2005/0189092 A1 | 9/2005 | Jahn et al. | |
| 2006/0189092 A1 | 8/2006 | Sato et al. | |
| 2007/0051095 A1 | 3/2007 | Lutz | |

FOREIGN PATENT DOCUMENTS

DE        42 14 579        11/1993

(Continued)

Primary Examiner—Willis R Wolfe, Jr.
(74) Attorney, Agent, or Firm—Leydig, Voit & Mayer, Ltd.

(57) ABSTRACT

The invention relates to an exhaust gas heat exchanger, in particular, to an exhaust gas cooler for exhaust gas recirculation in a motor vehicle comprising heat exchanging channels (3) which are coolable by a fluid and passed through by the exhaust gas, wherein the inventive exhaust gas heat exchanger (1) is integrated into an oxidation catalyst comprising a support provided with an oxidation catalyst coating (6) in such a way a deposit (5) is formed in the channels (3).

15 Claims, 2 Drawing Sheets

FOREIGN PATENT DOCUMENTS

Figure 1:
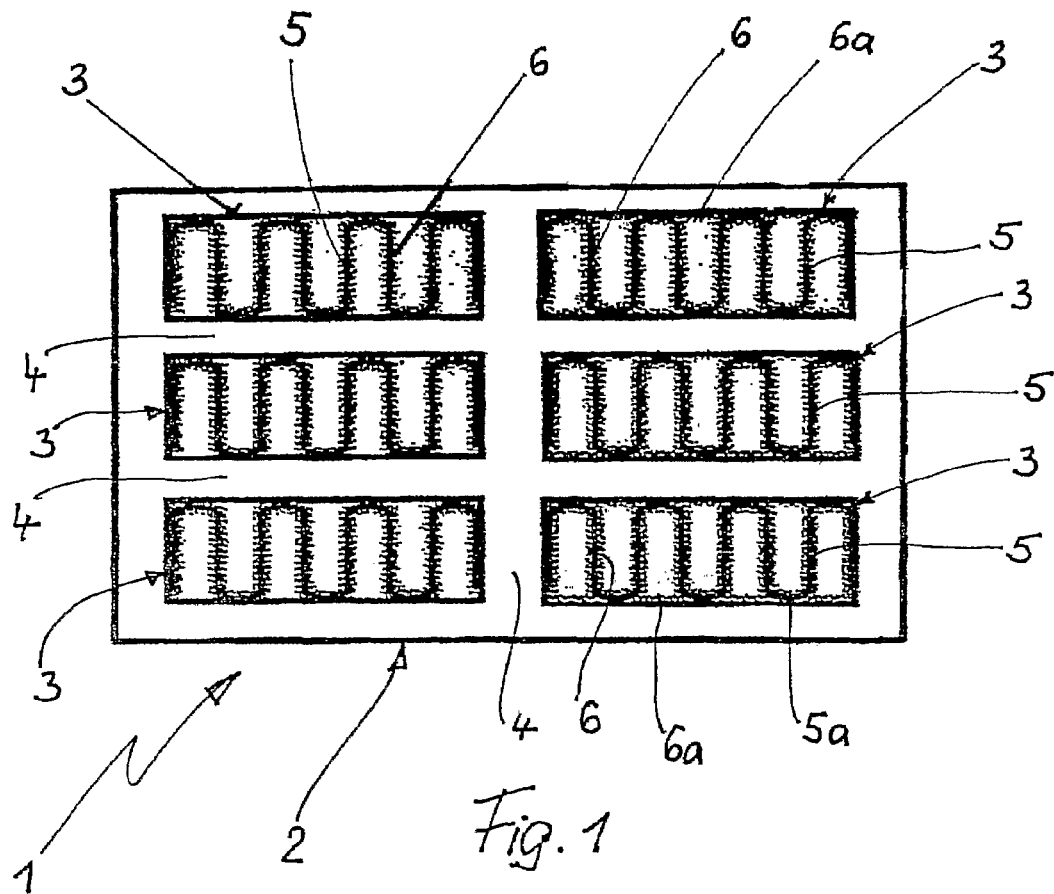

| | | |
|---|---|---|
| DE | 195 40 683 | 5/1997 |
| DE | 199 07 163 | 10/1999 |
| DE | 101 24 383 | 1/2002 |
| DE | 103 26 381 | 1/2005 |
| DE | 102004042454 | 4/2005 |
| EP | 1 486 749 | 12/2004 |
| JP | 62045922 A * | 2/1987 |
| JP | 2000-38962 | 2/2000 |
| JP | 2000-249003 | 9/2000 |
| JP | 2000-257512 | 9/2000 |
| WO | WO 02/063231 | 8/2002 |
| WO | WO 2005/031235 | 4/2005 |

* cited by examiner

EXHAUST GAS HEAT EXCHANGER, IN PARTICULAR AN EXHAUST GAS COOLER FOR EXHAUST GAS RECIRCULATION IN A MOTOR VEHICLE

The invention pertains to an exhaust gas heat exchanger, particularly an exhaust gas cooler for exhaust gas recirculation in motor vehicles.

An exhaust gas heat exchanger of this type has been disclosed in a prior patent application by the applicant that was assigned filing number 10 2004 042 454.3. The exhaust gas heat exchanger is realized in the form of an exhaust gas cooler and arranged in an exhaust gas recirculation line of a diesel engine. In this case, the exhaust gas cooler is provided with an oxidation catalyst that is integrated into the exhaust gas cooler in one embodiment (according to FIG. 4 of the prior application) in such a way that the oxidation catalyst coating is arranged on the inner wall of the exhaust gas pipes. This provides the advantage of converting the hydrocarbons (HC) contained in the diesel exhaust gas such that the deposition of soot in the exhaust gas pipes is also reduced. However, one disadvantage of this solution can be seen in that the heat transfer, as well as the heat conduction, is impaired in the exhaust gas pipes due to the catalytic coating that preferably consists of a precious metal, e.g., platinum. In addition, the oxidation catalyst coating, i.e., the catalyst, has a relatively low temperature because it is arranged on the pipe wall that is externally cooled with a liquid medium. However, the oxidation catalyst needs to have a certain minimum temperature in order to "light": the oxidation of hydrocarbons—as well as of carbon monoxide (CO)—takes place in a temperature range between approximately 200 and 600 degrees Celsius. Due to this type of arrangement of the coating and the resulting relatively low temperature, an optimal catalytic efficiency is not achieved in this case.

JP 2000 257512 A, JP 2000 249003 A and JP 2000 038962 A disclose exhaust gas coolers of an exhaust gas recirculation system, wherein the inner wall of the exhaust gas pipes (exhaust gas side) is provided with a catalytic coating, particularly an oxidation catalyst such as platinum. The aforementioned disadvantages, i.e., an excessively low temperature of the oxidation catalyst, also apply to these inner wall coatings.

The present invention is based on the objective of additionally improving an exhaust gas heat exchanger of the type disclosed in the aforementioned prior application. The invention aims, in particular, to improve the efficiency of the oxidation catalyst.

This objective is attained with the characteristics of Claim 1. The novelty in comparison with the exhaust gas heat exchanger according to the prior application can be seen in that the oxidation catalyst substance is arranged on an insert situated in the channel through which the exhaust gas flows. In this context, the term insert refers to any structure or baffle that occupies part of the cross section of the exhaust gas channels. It may refer, for example, to conventional turbulence inserts—as disclosed in the dependent claims—that are inserted into the respective channels or pipes in the form of separate parts. Other possible inserts are internal undulating ribs with or without incisions, solid ribs or the like. The inserts form the carriers for the oxidation catalyst substance that therefore is not—primarily—arranged on the inner wall of the exhaust gas channels, but within the flow cross section of the exhaust gas channels where the temperatures are substantially higher than on the channel wall. This provides the advantage that the oxidation catalyst is much more effective due to its higher temperature and therefore starts the oxidation process faster and more effectively. Other advantages can be seen in the improved heat transfer on the exhaust gas side and consequently the improved exhaust gas cooling. This makes it possible to utilize smaller exhaust gas heat exchangers and therefore to reduce the weight and the costs.

The channels or exhaust gas pipes may have any cross section, wherein circular and rectangular cross sections are preferred.

The inserts are advantageously connected to the inner wall of the pipes by means of soldering or welding, namely at contact points in the form of domes, undulation crests or rib arches. One advantageous embodiment of the invention proposes that only part of the undulation crests of an undulating rib are connected to the inner wall of the pipe rather than all undulation crests, with the remainder of the undulation crests spaced apart from the pipe wall such that the hot exhaust gas is able to flow completely around these undulation crests. This provides the advantage of an improved conversion due to the higher temperature of the oxidation catalyst.

The inserts in the form, e.g., of undulating ribs or solid ribs do not necessarily have to be manufactured in the form of separate parts, but may also be realized integrally with the pipe wall of the exhaust gas pipe, e.g., with a flat pipe cross section.

According to another advantageous embodiment of the invention, the catalytic substance is also arranged on the inner wall of the pipe such that a coating of the oxidation catalyst substance is provided on the entire surface over which the exhaust gas flows. The advantages attained with this embodiment can be seen in the simplified coating or manufacture of the exhaust gas pipes, as well as a maximum catalytic effect.

According to one additional development, the channels are formed by adjacent disks. In this case, it is particularly advantageous that the channels can be manufactured by means of metal-forming techniques such as pressing or punching or by means of a primary forming technique such as casting.

In another advantageous embodiment, the disks form disk pairs. In this case, the disks and/or adjacent disk pairs can be advantageously stacked and/or connected to one another, particularly by means of an integral connecting technique such as welding, soldering, bonding, etc.

Figure 2:
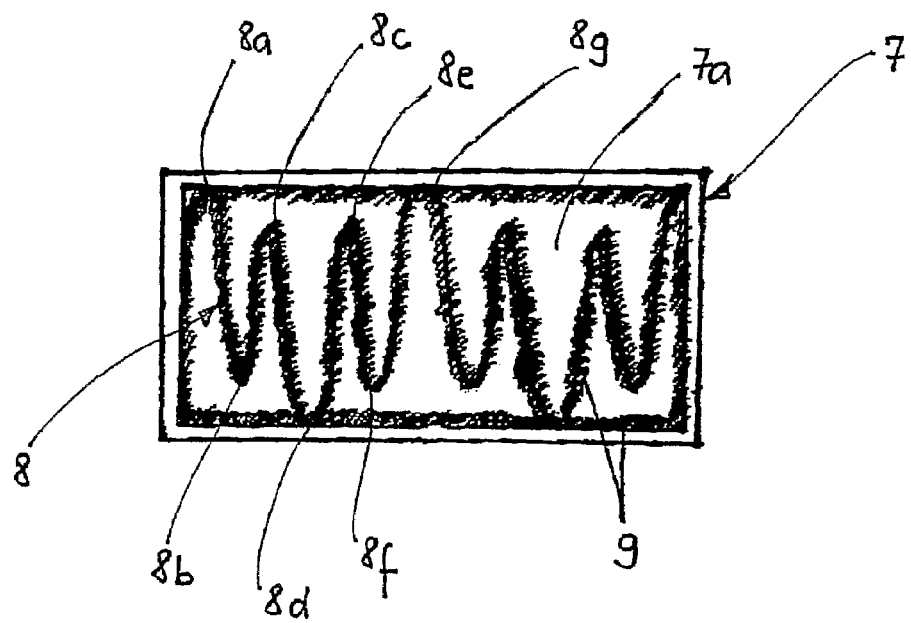
Figure 3:
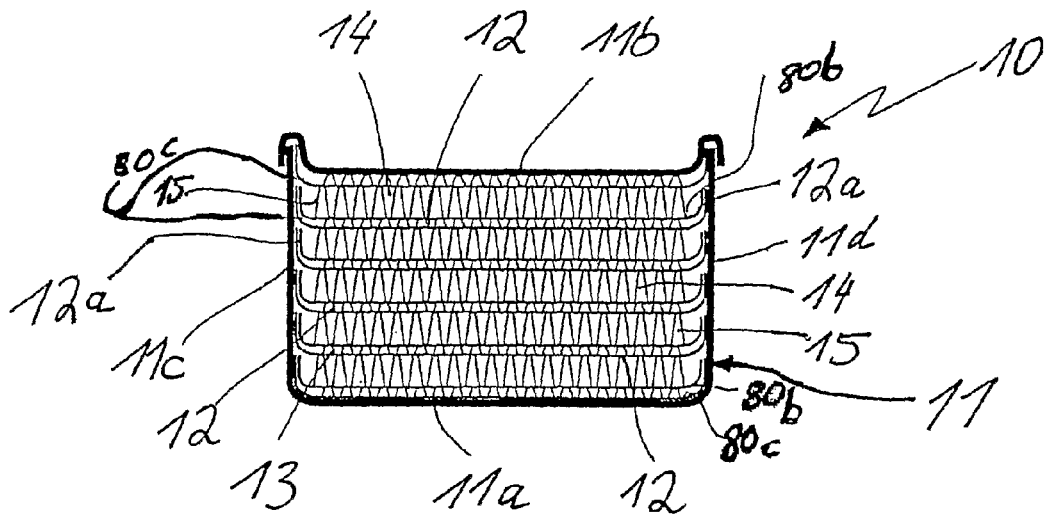
Figure 4:
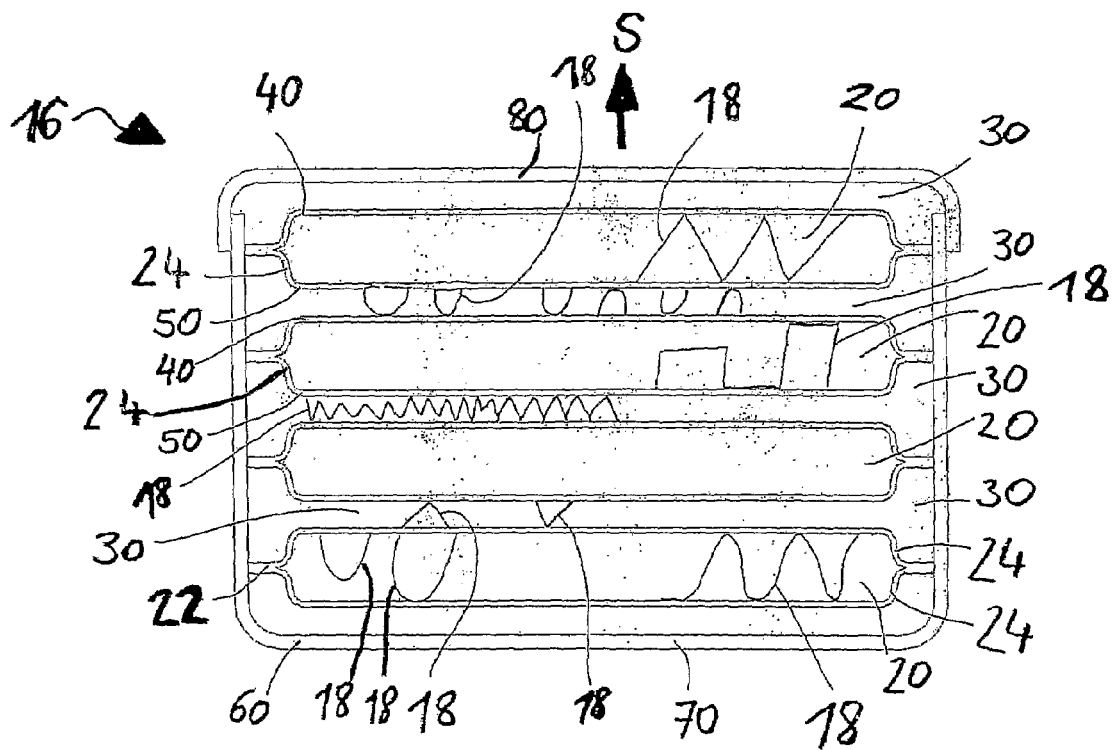

Embodiments of the invention are illustrated in the figures and described in greater detail below. The figures show:

FIG. 1, a cross section through an exhaust gas cooler;

FIG. 2, a cross section through an exhaust gas pipe with modified internal rib;

FIG. 3, a section through another embodiment of an exhaust gas heat exchanger, and FIG. 4, another embodiment of a heat exchanger, particularly an exhaust gas heat exchanger.

FIG. 1 shows a cross section through an exhaust gas heat exchanger 1 that can be used as an exhaust gas cooler in a nonillustrated exhaust gas recirculation system (EGR-system). In other respects, reference is made to the initially cited prior application, the complete content of which, including the cited prior art, is hereby incorporated into the disclosure of this application by reference. The exhaust gas heat exchanger 1 features a housing shell 2 that has an approximately rectangular cross section and accommodates an assembly of exhaust gas pipes 3 of approximately rectangular cross section such that gaps 4 are formed between the exhaust gas pipes and the housing shell 2, wherein a liquid coolant is able to flow through the aforementioned gaps. Exhaust gas heat exchangers of this type are described in greater detail in DE 199 07 163 C2 and DE 195 40 683 A1 of the applicant. The coolant is obtained from a nonillustrated coolant circuit of an internal combustion engine of the motor vehicle and cools the hot exhaust gas flowing through the exhaust gas pipes 3. Meander-shaped inserts 5 arranged within the exhaust gas pipes 3 are also referred to as internal ribs. The internal ribs 5 feature domes 5a (undulation crests) that are preferably soldered or welded to the inner wall of the exhaust gas pipes 3. The surface of the internal ribs 5 is coated with an oxidation catalyst substance, for example, precious metals such as platinum. On the right side of the figure, not only are the internal ribs 5 catalytically coated, but an oxicatalytic coating 6a is also provided on the inner walls of the exhaust gas pipes 3. This means that—on the right side of the figure—a catalytic coating is provided on the entire surface over which the exhaust gas flows. The hot exhaust gas flowing through the exhaust gas pipes 3 consequently comes in contact with a catalytic coating that is situated within the flow cross section and therefore has a high temperature—in comparison with the cooled wall of the exhaust gas pipes 3. This promotes the conversion, i.e., the oxidation of hydrocarbons and carbon monoxide.

The inserts may also have shapes other than those illustrated in the figure, e.g., undulating ribs (of approximately sinusoidal shape) that may also be provided with incisions. It would also be conceivable to utilize triangular or trapezoidal internal ribs, as well as the aforementioned turbulence inserts.

The inserts may furthermore be realized integrally with the pipe walls, particularly in pipes with rectangular cross section that are shaped or folded from a metal sheet and subsequently soldered or welded.

Undulating inserts may be used advantageously as the support for oxicatalytic substance in pipes with circular cross section, for example.

FIG. 2 shows a second embodiment of the invention, in which only the cross section of an individual exhaust gas pipe 7 is illustrated. An internal rib 8 realized in an undulating fashion (undulating rib) is arranged within a rectangular flow cross section 7a for the exhaust gas, wherein the respective undulation crests or rib arches are offset relative to one another in such a way that only some of them, in the figure the undulation crests 8a, 8d and 8g, come in contact with the inner wall of the exhaust gas pipe 7 and are soldered to the pipe wall at these contact points. The remaining undulation crests, in the figure the undulation crests 8b, 8c, 8e and 8f, are spaced apart from the inner wall and subjected completely to the exhaust gas flow. The entire internal rib 8 and the inner wall of the exhaust gas pipe 7 are provided with a continuous oxicatalytic coating 9. The partial connection of the undulating rib 8 additionally raises the average temperature of the catalytic coating such that a superior efficiency of the oxidation catalyst is achieved.

FIG. 3 shows a sectional representation of another embodiment of an exhaust gas heat exchanger 10 that is realized in the form of an exhaust gas cooler and can be used in an exhaust gas recirculation system (EGR system) of an internal combustion engine for motor vehicles. EGR systems are known from the state of the art: in this case, the exhaust gas of the internal combustion engine is withdrawn upstream or downstream of an exhaust gas turbine (high-pressure or low-pressure recirculation) and returned to the intake section of the internal combustion engine after being cooled in one or two stages. The quantity of exhaust gas withdrawn is controlled by an exhaust gas recirculation valve (EGR valve). Exhaust gas flows through the depicted exhaust gas cooler 10 which is cooled by a liquid coolant that is preferably obtained from the cooling circuit of the internal combustion engine. The exhaust gas cooler 10 features a two-part housing 11 that consists of a trough-shaped housing shell 11a and a cover 11b—both parts are preferably realized in the form of sheet metal parts that can be manufactured by means of deep-drawing. The coolant flows through an assembly of disk pairs 12 arranged in the housing shell 11a. The disk pairs 12 extend over the entire width of the housing shell 11a that, according to the figure, features two vertical housing walls 11c, 11d extending parallel to one another. The disk pairs 12 have longitudinal sides 12a that adjoin the housing walls 11c, 11d to form flow channels that are equipped with turbulence inserts 13 in order to increase the heat transfer. The parallel disk pairs 12 are spaced apart from one another and form flow channels 14 for the exhaust gas. Turbulence inserts 15 are arranged in the flow channels 14 in order to increase the heat transfer. All parts of the exhaust gas cooler 10 are integrally connected to one another, i.e., by means of soldering, welding, bonding, etc. The soldering, welding or bonding is preferably carried out in one production step in a nonillustrated soldering furnace or welding apparatus or by means of a bonding device. The disk pairs respectively feature an upper disk 80b and a lower disk 80c.

FIG. 4 shows another embodiment of a heat exchanger 16, particularly an exhaust gas heat exchanger. The heat exchanger 16 features a first housing element 60, 70 and a second housing element 80. First disks 40 and second disks 50 are accommodated in the housing element 60, 70. The first disks 40 and the second disks 50 are essentially arranged parallel to one another and can be stacked. A first disk 40 and a second disk 50 form a disk pair 22. The first and second disks are integrally connected to one another, particularly by means of soldering, welding or bonding. Analogously, adjacent disk pairs 22 are integrally connected to one another at cups 20 on both disk ends of the disks 40, 50 or the disk pairs 22, respectively, particularly by means of soldering, welding or bonding. The disks 40, 50 and the disk pairs feature cup openings. The first housing element 60, 70 is integrally and/or positively connected to the second housing element. The second housing element features a first housing opening for admitting the first medium. The first medium, particularly the hot exhaust gas, flows through the first flow channel 20 and into the disk pairs 22 through cup openings. The hot exhaust gas then flows through the disk pairs in the flow channel 20 arranged in the interior and out of the housing element 80 through a second housing opening. The disk pairs can be stacked in the stacking direction S. The housing element 80 features a third housing opening for admitting a cooling medium, particularly a liquid coolant, cooling water, gas or refrigerant, particularly of an air-conditioning system, into the first housing element 60, 70 in order to cool this housing element and to largely prevent thermal stresses. The second cooling medium flows around the outer sides of the disks 40, 50 and the disk pairs 22, as well as the outer sides of the marginal surfaces 24 of the disk pairs. It flows through openings formed by the spaced-apart disk pairs such that a heat exchange with the exhaust gas to be cooled takes place. Second flow channels 30 for the cooling medium are also formed between the first housing element 60, 70 and the marginal surfaces 24 of the disk pairs in order to cool the housing element 60, 70. The cooling medium is discharged from the housing element 80 through a fourth housing opening. The heat exchanger 16 is realized in the form of a module that can be installed in a modular system. The heat exchanger can be integrated into a cooling module. The cooling module comprises, in particular, several heat exchangers, particularly coolant coolers, oil coolers, charge air coolers, exhaust gas coolers or heat exchangers of an air-conditioning system.

The housing element 60, 70 accommodates the disks 40, 50 and the disk pairs 22 in its interior. The first housing element 60, 70 is connected to the second housing element 80 integrally by means of soldering, welding, bonding, etc. and/or closed by means of edge-forming, slot forming, crimping, folding, clips, etc. In one nonillustrated embodiment, both housing elements are sealed relative to one another by means of a sealing element, particularly an O-ring or the like.

Adjacent disk pairs are spaced apart by embossed structures, particularly turbulence inserts or turbulence-generating elements 18. This improves, in particular, the heat transfer between the first medium and the second medium. Embossed structures, particularly turbulence inserts or turbulence-generating elements 18, are also arranged within the disk pairs and integrally connected to the disks 40, 50 by means of soldering, welding or bonding and/or made of these disks by means of metal-forming.

The inserts 5, 8, 13, 15, 18 are made of aluminum.

In another embodiment, the inserts 5, 8, 13, 15, 18 are made of ferrite.

In another embodiment, the inserts 5, 8, 13, 15, 18 are made of high-temperature steel with an aluminum content of up to 10%.

In another embodiment, the inserts 5, 8, 13, 15, 18 are made of high-temperature steel with an aluminum content of up to 10%.

In another embodiment, the inserts 5, 8, 13, 15, 18 are made of high-temperature steel with an aluminum content of up to 6%.

In another embodiment, the inserts 5, 8, 13, 15, 18 are made of high-temperature steel with an aluminum coating.

In another embodiment, the inserts 5, 8, 13, 15, 18 are made of high-temperature steel with an aluminum coating.

In another embodiment, the inserts 5, 8, 13, 15, 18 are made of high-temperature steel with an aluminum plating.

The invention claimed is:

1. An exhaust gas heat exchanger for exhaust gas recirculation in motor vehicles, wherein exhaust gas flows through channels that can be cooled by a fluid, comprising an oxidation catalyst consisting of a carrier and an oxicatalytic coating integrated into the exhaust gas heat exchanger, wherein the carrier of the oxicatalytic coating is in the form of an insert arranged in the channels, wherein the channels have inner walls and the inserts include domes or undulation crests and wherein some of the inserts or undulation crests are only connected to the inner walls with part of the domes or undulation crests, and the remaining domes or undulation crests are spaced apart from the inner walls.

2. The exhaust gas heat exchanger according to claim 1, wherein the inserts are in the form of turbulence inserts.

3. The exhaust gas heat exchanger according to claim 1, wherein the inserts are in the form of internal ribs.

4. The exhaust gas heat exchanger according to claim 1, wherein the inserts are in the form of separate parts that can be inserted into the channels.

5. The exhaust gas heat exchanger according to claim 1, wherein the channels have inner walls and the inserts are integrally connected to the inner walls of the channels.

6. The exhaust gas heat exchanger according to claim 1, wherein the catalytic coating is also arranged on the inner walls of the channels.

7. The exhaust gas heat exchanger according to claim 1, wherein the inserts are in the form of undulating ribs.

8. The exhaust gas heat exchanger according to claim 7, wherein the undulating ribs include domes or undulation crests wherein some of the inserts or undulation crests are only connected to the inner wall with part of the domes or undulation crests, and the remaining domes or undulation crests are spaced apart from the inner wall.

9. The exhaust gas heat exchanger according to claim 1, wherein the channels are in the form of pipes.

10. The exhaust gas heat exchanger according to claim 9, wherein the pipes have a rectangular cross section.

11. The exhaust gas heat exchanger according to claim 9, wherein the inserts are in one piece with the pipes.

12. The exhaust gas heat exchanger according to claim 9, wherein the catalytic coating is also arranged on the inner walls of the pipes.

13. The exhaust gas heat exchanger according to claim 1, wherein the channels are formed by disks.

14. The exhaust gas heat exchanger according to claim 13, wherein the disks form disk pairs.

15. The exhaust gas heat exchanger according to claim 14, wherein the catalytic coating is also arranged on the inner walls of the disk pairs.

* * * * *